(12) United States Patent
Adams et al.

(10) Patent No.: US 11,520,139 B2
(45) Date of Patent: Dec. 6, 2022

(54) ROTATING STEERING MIRROR AND METHODS, ASSEMBLIES, AND SYSTEMS THEREOF

(71) Applicant: LOCKHEED MARTIN CORPORATION, Bethesda, MD (US)

(72) Inventors: Dennis J. Adams, Stow, OH (US); Alan F. Lindsay, Canton, OH (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 297 days.

(21) Appl. No.: 16/852,816

(22) Filed: Apr. 20, 2020

(65) Prior Publication Data

US 2021/0325664 A1  Oct. 21, 2021

(51) Int. Cl.
| | | |
|---|---|---|
| G02B 26/08 | (2006.01) | |
| G02B 26/10 | (2006.01) | |
| G02B 26/12 | (2006.01) | |
| G02B 7/18 | (2021.01) | |

(52) U.S. Cl.
CPC ......... *G02B 26/105* (2013.01); *G02B 7/1805* (2013.01); *G02B 26/124* (2013.01)

(58) Field of Classification Search
CPC .. G02B 26/105; G02B 7/1805; G02B 26/124; G02B 7/1827

USPC ........................................................ 359/224.1
See application file for complete search history.

(56) References Cited

U.S. PATENT DOCUMENTS

| | | |
|---|---|---|
| 7,898,712 B2 | 3/2011 | Adams et al. |
| 8,400,700 B2 | 3/2013 | Adams et al. |
| 9,971,148 B2 * | 5/2018 | Carothers ................ G02B 5/04 |

OTHER PUBLICATIONS

"SA1, Lily Bearing", Shanghai Lily Bearing Manufacturing Co, Ltd., https://www.lily-bearing.com/products/, Jul. 2, 2019, 4 pages.
"Incremental Rotary Encoders in Standard Design", Numerik Jena, https://www.numerikjena.de/en/rotary-encoders/incremental-rotary-encoders-from-numerik-jena/incremental-rotary-encoders-in-standard-design/, Jul. 1, 2019, 12 pages.

* cited by examiner

*Primary Examiner* — Euncha P Cherry
(74) *Attorney, Agent, or Firm* — Michael Best & Friedrich LLP

(57) ABSTRACT

A rotating steering mirror assembly comprising a first wedge rotatable relative to a base and a second wedge rotatable relative to the first wedge to controllably tilt a mirror on an outward- or forward-facing surface of the second wedge. Respective motors can independently rotate the first and second wedges.

20 Claims, 6 Drawing Sheets

ROTATING STEERING MIRROR AND METHODS, ASSEMBLIES, AND SYSTEMS THEREOF

SUMMARY

Embodiments of the disclosed subject matter relate to a rotating steering mirror, such as a rotating agile steering mirror (RASM), and methods, assemblies, and systems thereof.

According to one or more embodiments of the present disclosure, a rotating steering mirror assembly can be implemented. The rotating steering mirror assembly can comprise a base; a first wedge rotatably connected to the base; a second wedge rotatably connected to the first wedge; and a mirrored surface on a front surface of the second wedge.

One or more embodiments of the present disclosure can involve a rotating agile steering mirror (RASM) assembly. The RASM assembly can comprise a base provided at a rear of the RASM assembly; a first wedge rotatable relative to the base; a second wedge rotatable relative to the first wedge; a first motor operatively coupled to the first wedge to rotatably move the first wedge relative to the base and the second wedge; a second motor operatively coupled to the second wedge to rotatably move the second wedge relative to the first wedge and the base; a first rotary encoder operative with the first motor to determine position of the first motor; a second rotary encoder operative with the second motor to determine position of the second motor; and a mirror provided at a front of the RASM assembly and rotatable in correspondence with the second wedge. The first wedge and the second wedge can be stacked relative to each other, the first wedge and the second wedge can be independently and exclusively drivable by the first motor and the second motor, respectively, and/or the mirror can be tiltable, based on controlled independent rotation of the first wedge and the second wedge, to any angle between +/− the sum of respective angles of the first and second wedges.

Additionally, one or more embodiments of the disclosed subject matter can implement a method regarding a rotating steering mirror or rotating steering mirror assembly. The method can comprise providing a base of the rotating steering mirror/rotating steering mirror assembly; providing a first wedge of the rotating steering mirror assembly, the first wedge being rotatable relative to the base; providing a second wedge of the rotating steering mirror assembly, the second wedge being rotatable relative to the first wedge; providing a first motor of the rotating steering mirror assembly, the first motor being operative to rotate the first wedge relative to the base and the second wedge; providing a second motor of the rotating steering mirror assembly, the second motor being operative to rotate the second wedge relative to the first wedge and the base; and providing a mirror, the mirror being rotatable in correspondence with the second wedge. The first wedge and the second wedge can be stacked relative to each other, and/or the first wedge and the second wedge can be independently and exclusively drivable by the first motor and the second motor, respectively.

Embodiments can also include methods of providing, making, and/or using apparatuses and systems, or portions thereof, according to one or more embodiments of the disclosed subject matter. Further, methods according to one or more embodiments of the disclosed subject matter may be computer-implemented methods at least in part, for instance, via a non-transitory computer-readable storage medium storing computer-readable instructions that, when executed by a computer, cause the computer to perform the method.

The preceding summary is to provide an understanding of some aspects of the disclosure. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings, which are incorporated in and constitute a part of the specification, are illustrative of one or more embodiments of the disclosed subject matter, and, together with the description, explain various embodiments of the disclosed subject matter. Further, the accompanying drawings have not necessarily been drawn to scale, and any values or dimensions in the accompanying drawings are for illustration purposes only and may or may not represent actual or preferred values or dimensions. Where applicable, some or all select features may not be illustrated to assist in the description and understanding of underlying features.

DETAILED DESCRIPTION

Figure 1:
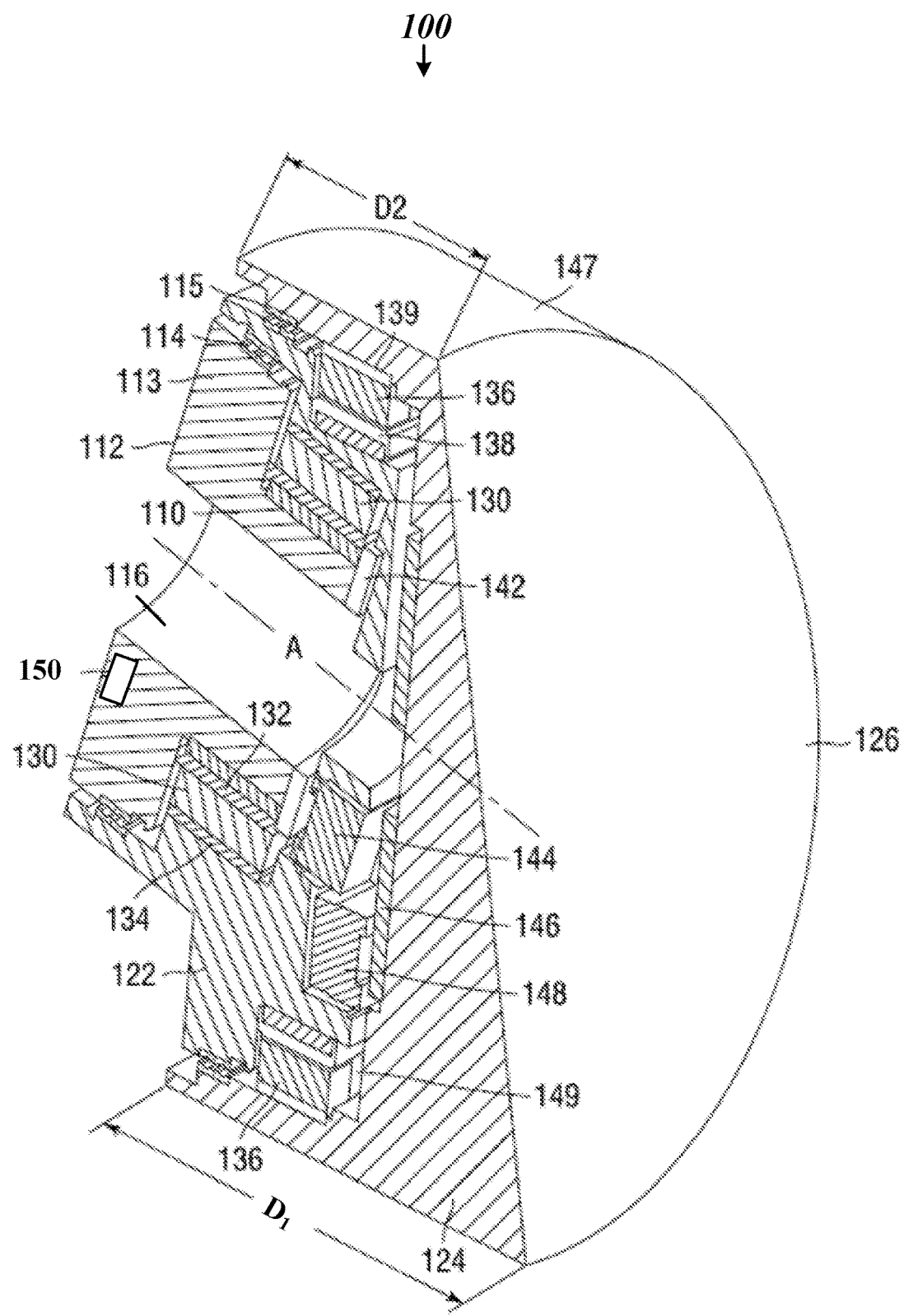
FIG. 1 is a perspective sectional view of a rotating steering mirror assembly according to one or more embodiments of the disclosed subject matter.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more" or "at least one." The phrases "at least one," "one or more," "or," and "and/or" are open-ended expressions that can be both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" can mean A alone, B alone, C alone, A and B together, A and C together, B and C together, or A, B and C together. It is also to be noted that the terms "comprising," "including," and "having" can be used interchangeably.

It is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Agile beam-steering technologies for laser radar application may require the ability to point rapidly to a large number of widely spaced objects. Examples of such applications for agile pointing include imaging sensors for tracking and discrimination of military targets, sensors for surveillance and tracking of space objects, and optical communication systems. In general, pointing agility may permit a laser radar system to operate more efficiently by allowing each system platform to address a large number of separate targets. As an example, the laser may be an electro-optic/infrared transmit beam or receive line of sight (LOS) beam from a beam forming telescope or any collimated optical beam, such as a light emitting diode light beam emitted from optical fibers or other beam forming optics.

Pointing agility has been realized in a number of ways, for example, by employing steering mirrors, electro-acoustic and electro-optic devices, electro-optic phased arrays, and micro lens arrays. Embodiments of the disclosed subject matter relate to a rotating steering mirror, such as a rotating agile steering mirror (RASM), and methods, assemblies, and systems thereof.

Embodiments generally may be considered compact and lightweight devices, and, moreover, can be used to steer a transmit beam (e.g., an electro-optic/infrared beam) and/or to receive line of sight (LOS) according to a relatively high correction bandwidth over an extended range of angles or field of regard (FOR) (e.g., 10s of degrees). Embodiments of the disclosed subject matter, which may be referred to herein as a rotating agile steering mirror (RASM) system, apparatus, assembly, or method, can, generally speaking, involve a compact, reflective steering mechanism comprised of two stacked wedges rotatable via respective motors to precise positions, for instance, using respective rotary encoders. Since the wedges can be stacked and independently rotated by their own motors, a mirror provided on an outer- or forward-facing surface of an outer- or forward-most one of the wedges can be tilted to a desired angle up to +/− the sum of the angles of the two wedges. Embodiments of the disclosed subject matter can incorporate relatively large motors, bearings, and rotary encoders relative to a diameter of the mirror.

Embodiments of the disclosed subject matter can provide relatively high torque and relatively low mass/inertia for movement of the wedges (and hence the mirror), thereby offering a unique combination of relatively wide steering angles, relatively high mechanical stiffness, relatively high bandwidth, relatively fast response (e.g., >100 Hz), and relatively low size, weight and power (SWaP). Such relatively high correction bandwidth over an extended range of angles or field of regard (FOR) according to embodiments of the disclosed subject matter can be greater than conventional pointers/gimbals and fast-steering mirrors (FSM), respectively. Embodiments of the disclosed subject matter may not be necessarily limited in size or usage, and may be applied to such fields as spacecraft communication, optical communication systems, laser steering of satellites, cruise missiles, tracking and discrimination of military targets, sensors for surveillance, and tracking of space objects and the like.

Turning to the figures, FIG. 1 is a perspective sectional view of a rotating steering mirror assembly 100 according to one or more embodiments of the disclosed subject matter. As used in this description, the terms "axial" and "axially" can refer to the direction along an axis A as shown in FIG. 1, and the terms "radial" and "radially" can refer to the direction perpendicular to and extending from the axis A.

The rotating steering mirror assembly 100 can have a stacked configuration of a base 110, a first wedge 122, and a second wedge 124. Optionally, each of the base 110, the first wedge 122, and/or the second wedge 124 may be referred to as an assembly.

The base 110 may be provided at a bottom or rear of the rotating steering mirror assembly 100, and the second wedge 124 can be provided at or closer to a top or front of the rotating steering mirror assembly 100. According to one or more embodiments, the first wedge 122 can be closer to the base 110 than the second wedge 124 is to the base 110. Optionally, the angles of the first and second wedges 122, 124 may be the same (e.g., 12.5 degrees).

The base 110 can be stationary and can provide a mounting surface 112, which may include a flange 113 (e.g., an integral or formed-in-one-piece flange), for a mount, or otherwise constitute a mount to mount the rotating steering mirror assembly 100 to a chassis of a machine, such as a vehicle (e.g., an airplane). In this regard, the base 110 can support the other components of the rotating steering mirror assembly 100. According to one or more embodiments, an interior of the base 110 may be hollow or defined by an interior volume 116, such as shown in FIG. 1. The base 110, according to embodiments of the disclosed subject matter, can be made of a relatively rigid material, such as titanium, steel, aluminum, or composite.

According to one or more embodiments each of the base 110, the first wedge 122, and/or the second wedge 124 may be cylindrical or generally cylindrical in geometry. Optionally, the first wedge 122 can surround the base 110 in a radial direction, such as shown in FIG. 1. For example, an outer radial or peripheral surface 147 of the second wedge 124 can form a radially outer-most portion of the rotating steering mirror assembly 100, such as shown in FIG. 1, and, as shown, the outer peripheral surface 147 of the second wedge 124 can surround a portion of the first wedge 122. Optionally, one side of the outer peripheral surface 147 can have a first depth or thickness D1 and an opposite side of the outer peripheral surface 147 can have a second depth or thickness D2. As shown in FIG. 1, for instance, the depth D1 can be greater than the depth D2. According to one or more embodiments, the first wedge 122 and/or the second wedge 124 can be made of a relatively rigid material, such as titanium, steel, aluminum, or composite.

The rotating steering mirror assembly is not necessarily limited to two stacked wedges. The rotating steering mirror assembly may have three stacked wedges, for instance, where each wedge can include an associated motor, encoder, and bearings. Each motor can rotate its respective wedge independently, and the encoder read head wiring may be routed through a center hole in the wedge (or wedges) between the respective wedge and the mounting base. The third wedge can be used to steer a beam (or receiver line of sight) around a boresight (or zenith or nadir) position so the stacked wedges can continue to track through the boresight.

The rotating steering mirror assembly 100 can also include a mirror 126. The mirror 126 may be provided at the top or front of the rotating steering mirror assembly 100. According to one or more embodiments, the mirror 126 may be formed by or part of the second wedge 124, such as shown in FIG. 1. Alternatively, the mirror 126 may be a different component coupled to the second wedge 124. The surface of the mirror 126 may be in the form of a highly-reflective coating, such as aluminum, gold, or silver.

The rotating steering mirror assembly 100 can also have a first motor 130 and a second motor 136. Each of the first motor 130 and the second motor 136 can be, for instance, DC motors (e.g., a DC frameless motor, a stepper motor, or the like) or AC motors. The first motor 130 can be comprised of a stator 132 and a rotor 134. Likewise, the second motor 136 can be comprised of a stator 138 and a rotor 139.

Optionally, the first motor 130 may surround a portion of the base 110 and/or the first wedge 122 may surround the first motor 130 in a radial direction, such as shown in FIG. 1. Additionally, the second motor 136 may surround a portion of the first wedge 122 in the radial direction and/or the second wedge 124 can surround the second motor 136 in the radial direction, such as shown in FIG. 1.

Associated with the first motor 130 can be a first encoder (e.g., optical encoder, an angular position sensor or a resolver) having a grating disk 142 and a read head 144. According to one or more embodiments, the first encoder can be considered or characterized as a rotary encoder. The grating disk 142 can be provided at an end of the base 110, for instance, surrounding or circumscribing the axis A of the base 110, such as shown in FIG. 1. Wiring (not shown) can be routed from a controller 150 through a channel in base 110 to the grating disk 142 or through the interior volume 116 of the base 110. Incidentally, FIG. 1 shows an example where the controller 150 can be provided in the base 110. However, the controller 150 may be provided elsewhere, such as a chassis or mount to which the base 110 can be fixedly coupled. Also shown in FIG. 1, the grating disk 142 can be between the end of the base 110 and a portion of the first wedge 122. The read head 144 can be positioned on the first wedge 122. Wiring for the read head 144 can extend from the controller 150 through a channel in base 110 or through the internal volume 116 of base 110, as noted above, to a channel in first wedge 122 (not shown) to the read head 144. In general, the first encoder can determine positioning information of the first motor 130, particularly the positioning of the rotor 134.

Associated with the second motor 136 can be a second encoder (e.g., optical encoder, an angular position sensor or a resolver) having a grating disk 146 and a read head 148. According to one or more embodiments, the second encoder can be considered or characterized as a rotary encoder. The grating disk 146 can be provided at an interior, bottom- or rear-facing surface of the second wedge 124. Optionally, wiring to the grating disk 146 and the read head 148 can extend from controller 150 through a channel (not shown) to pass through the internal volume 116 in base 110 and an associated internal volume of first wedge 122 to enter a wiring channel (not shown) in second wedge 124 via a flexible service loop, a twist capsule, or a slip ring, for instance, located on the underside of the second wedge 124 at the central axis A. The read head 148 can be positioned facing the grating disk 146 and the interior surface of the second wedge 124. In general, the second encoder can determine positioning information of the second motor 136, particularly the positioning of the rotor 139.

The rotating steering mirror assembly 100 can also be comprised of one or more bearings. According to one or more embodiments, the one or more bearings may be considered or characterized as low-profile bearings in the context of rotating steering mirror assemblies according to embodiments of the disclosed subject matter. As non-limiting examples, the bearings may be ball bearings or thin-section bearings. In general, one or more bearings according to embodiments of the disclosed subject matter can be provided at respective peripheries of portions of the rotating steering mirror assembly 100.

For example, the rotating steering mirror assembly 100 of FIG. 1 can have a first bearing 114 (which may be comprised of multiple bearings) and a second bearing 115 (which may be comprised of multiple bearings). As shown in FIG. 1, for instance, the bearing 114 can be provided between a radially-outward-facing surface of the base 110 at an outer periphery thereof and a radially-inward-facing surface of the first wedge 122. Additionally or alternatively, as shown in FIG. 1, for instance, the bearing 115 can be provided between a radially-outward-facing surface of the first wedge 122 at an outer periphery thereof and a radially-inward-facing surface of the second wedge 124. The bearings 114 can hold (or assist with holding) the first wedge 122 to the base 110 and allow the first wedge 122 to rotate about the axis A relative to the base 110. Likewise, the bearings 115 can hold (or assist with holding) the second wedge 124 to the first wedge 122 and allow the second wedge 124 to rotate about the first wedge 122.

The first wedge 122, which may be concentric with the base 110, can be rotatable relative to the base 110, as noted above. And the second wedge 124 can be rotatable relative to the first wedge 122 and the base 110, as noted above. Additionally, the mirror 126 can be rotatable in correspondence with the second wedge 124. In this regard, the first motor 130 can be operatively coupled to drive (i.e., rotate or stop/hold still) the first wedge 122, and the second motor 136 can be operatively coupled to drive (i.e., rotate or stop/hold still) the second wedge 124. The first and second motors 130, 136 can drive the first and second wedges 122, 124 independently and exclusively of each other. That is, according to one or more embodiments, the first motor 130 can drive the first wedge 122 and not the second wedge 124, and the second motor 136 can drive the second wedge 124 and not the first wedge 122.

The controller 150, which may include or provide control to one or more motor drivers (e.g., a three-phase motor driver), can be provided and operatively coupled to the first motor 130 and the second motor 136 to control operation thereof to control positioning of the first wedge 122 and the second wedge 124, respectively. Such control can be regarding the positioning of the first wedge 122 and/or the second wedge 124 and optionally the speed of rotation for the first wedge 122 and/or the second wedge 124. Optionally, the controller and/or control wiring thereof can be provided fully or partially in the base 110.

Such positioning can be by way of rotation of the first wedge 122 and/or the second wedge 124 to desired positions. Optionally, the first wedge 122 can be rotatable in one or both directions (i.e., clockwise and counterclockwise). Likewise, the second wedge 124 can be rotatable in one or both directions (i.e., clockwise and counterclockwise). Such positioning can also be by way of stopping or holding still the first wedge 122 and/or the second wedge 124 at a desired position. Furthermore, such controlling can be based on feedback from the first and second encoders, which, generally speaking, can provide signals regarding positioning of the first and second motors 130, 136.

Thus, according to embodiments of the disclosed subject matter, the mirror 126 can be controlled to tilt according to desired angles based on the controlled independent rotation of the first wedge 122 and the second wedge 124 under control of the controller 150 providing control signals to the first and second motors 130, 136. According to one or more embodiments, the mirror 126 may be tilted to any angle between +/− the sum of respective angles of the first and second wedges 122, 124. In one non-limiting example, the angle of each of the wedges may be 12.5 degrees, which can mean that the mechanical tilt of the mirror 126 can be +/−25 degrees (e.g., 50 degrees of angular mechanical motion of the mirror surface, which provides up to 100 degrees of LOS steering). However, the angles of the wedges may be designed to steer to smaller or larger maximum angles. Additionally, the wedges do not have to be designed to have the same wedge angles and may have different thicknesses or wedge angles.

Figure 2:
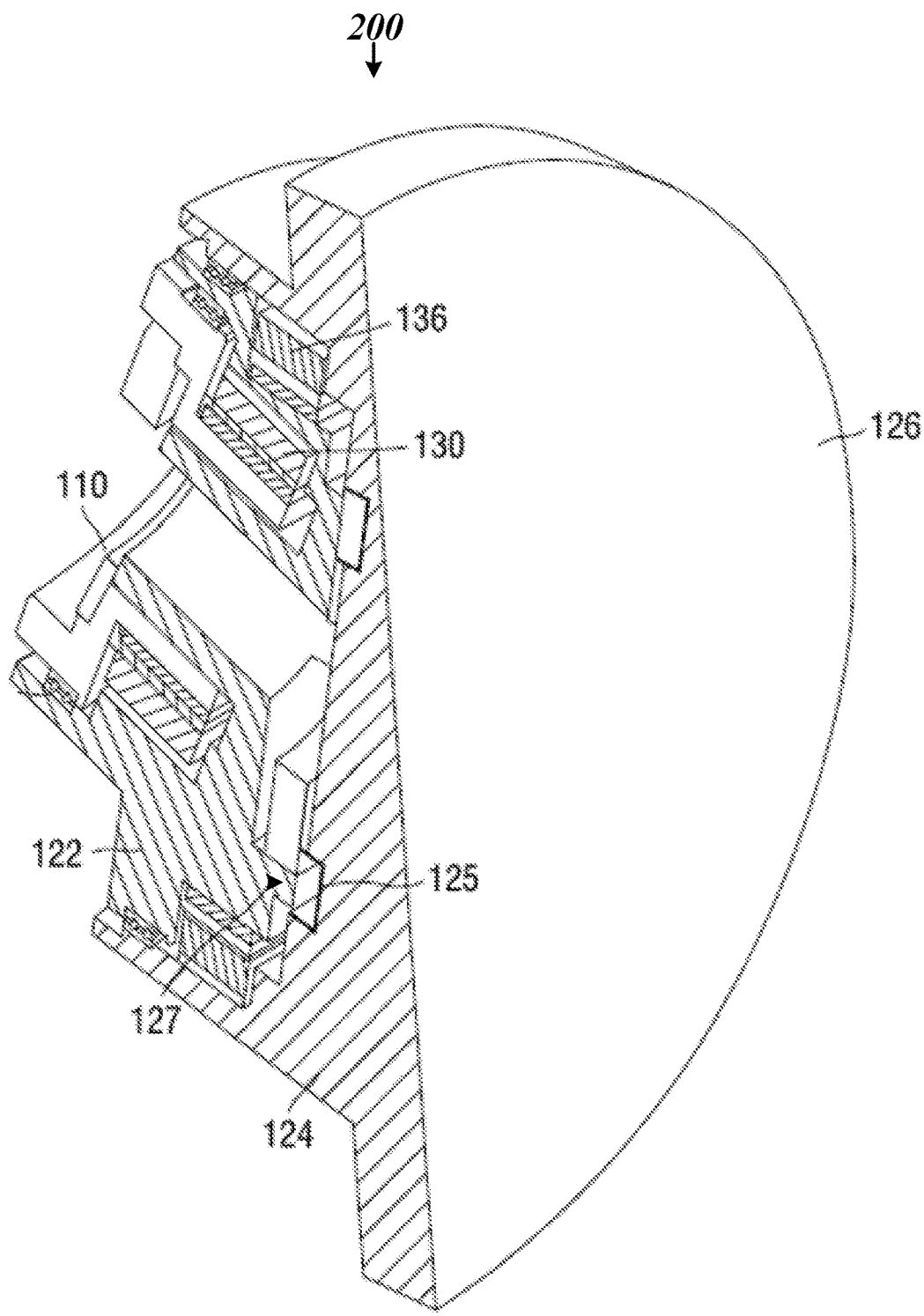
FIG. 2 is a perspective sectional view of a rotating steering mirror assembly according to one or more embodiments of the disclosed subject matter.
Figure 3:
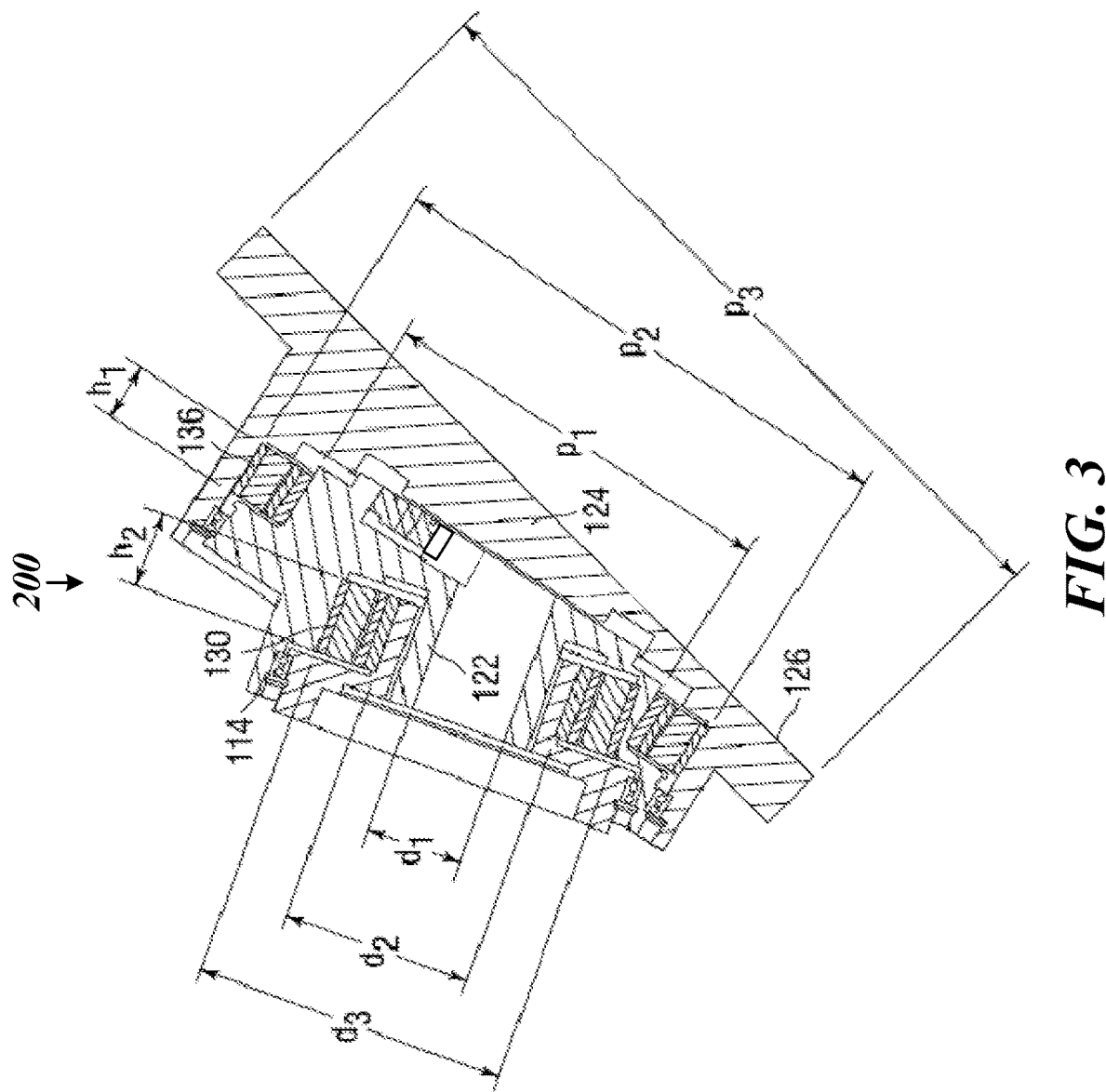
FIG. 3 is a side sectional schematic view of the rotating steering mirror assembly of FIG. 2.

Turning to FIG. 2 and FIG. 3, FIG. 2 is a perspective sectional view of a rotating steering mirror assembly 200 according to one or more embodiments of the disclosed subject matter.

The rotating steering mirror assembly 200 is similar to the rotating steering mirror assembly 100 of FIG. 1 above, having a stacked configuration of a base 110, a first wedge 122, a second wedge 124, a mirror 126, a first motor 130, a second motor 136, and other supporting components, though provided according to different form and arrangement.

For example, the base 110 can surround a portion of the first wedge 122, such as shown. Additionally, the front face or surface of the second wedge 124, which may include or be the mirror 126, can form a ledge around a periphery thereof, where an outer radial or peripheral surface can form a widest part of the rotating steering mirror assembly 200. The rotating steering mirror assembly 200 can also have a channel 125 in an inner-facing surface of the second wedge 124 to receive a mating protrusion 127 of the first wedge 122, both of which can be in the form of a ring or annular.

As shown in FIG. 3, for instance, according to one or more embodiments of the disclosed subject matter, for a diameter $d_1$ of an inner bore of the first wedge 122, a diameter $d_2$ of the bore of the radially outer surface of the base 110 can be greater than the diameter $d_1$, for instance, approximately twice the diameter $d_1$. The diameter $d_3$ of a cutout for the first motor 130 in the first wedge 122 can be greater than the diameter $d_1$, for instance, three times $d_1$.

A height of the cutout $h_2$ for the first motor 130 and a height of a cutout $h_1$ for the second motor 136 can have a relationship that $h_2$ is greater than $h_1$, for instance, about 1.3 times $h_2$. The radially outer surface of the first wedge 122 can have a diameter $p_1$, the inner bore of the second wedge 124 can have a diameter $p_2$, and the radially outer diameter of the mirror surface 126 can be $p_3$, where $p_3$ can be greater than $p_1$, for instance, approximately twice $p_1$. In a non-limiting example, specific values may be as follows: $d_1$=0.75 in., $d_2$=1.484 in., $d_3$=2.435 in., $h_1$=0.6 in., $h_2$=0.4375 in., $p_1$=3.136 in., $p_2$=4.087 in., and $p_3$=6.0 in.

Thus, according to embodiments of the disclosed subject matter, the mirror 126 of the rotating steering mirror assembly 200 can be controlled to tilt according to desired angles based on the controlled independent rotation of the first wedge 122 and the second wedge 124 under control of the controller (not expressly shown in FIG. 2 and FIG. 3) providing control signals to the first and second motors 130, 136. According to one or more embodiments, the mirror 126 may be tilted to any angle between +/− the sum of respective angles of the first and second wedges 122, 124. In one non-limiting example, the angle of the wedges may be 12.5 degrees, which can mean that the mechanical elevation tilt of the mirror 126 can be +/−25 degrees (e.g., +/−50 degrees of total angular mechanical motion of the mirror surface, which provides up to 100 degrees of LOS steering).

Figure 4:
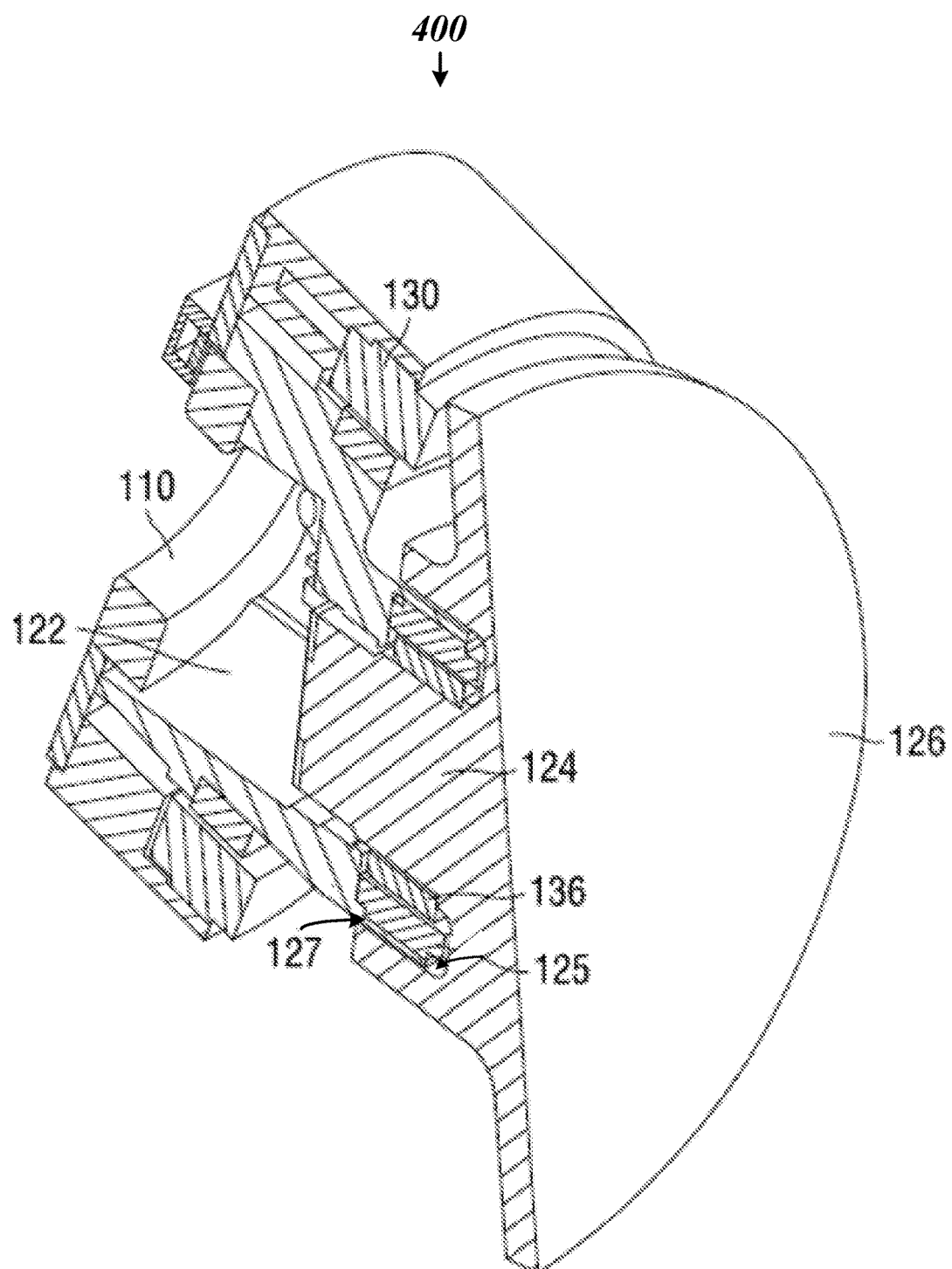
FIG. 4 is a perspective sectional view of a rotating steering mirror assembly according to one or more embodiments of the disclosed subject matter.
Figure 5:
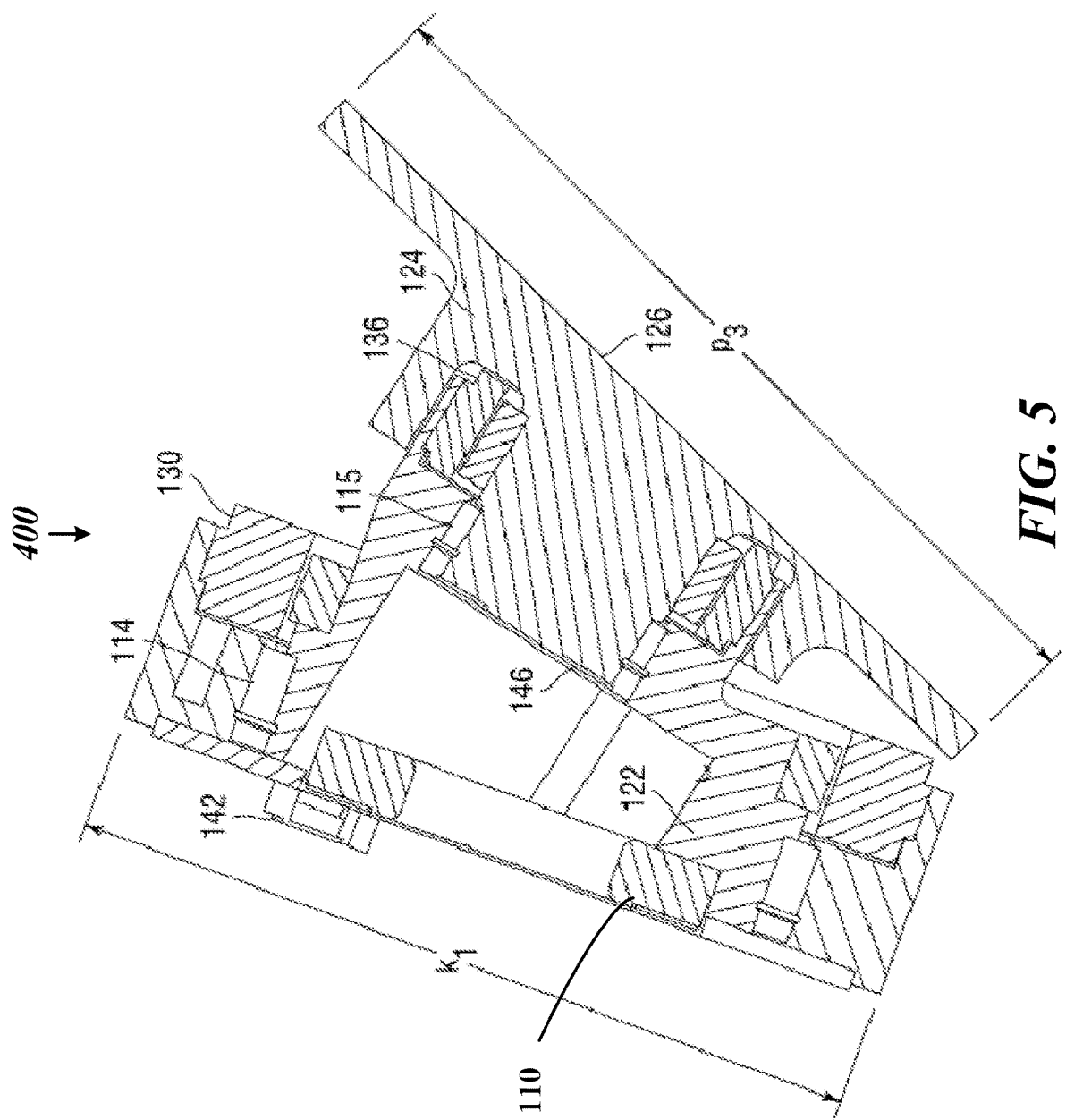
FIG. 5 is a side sectional schematic view of the rotating steering mirror assembly of FIG. 4.

Turning to FIG. 4 and FIG. 5, FIG. 4 is a perspective sectional view of a rotating steering mirror assembly according to one or more embodiments of the disclosed subject matter.

The rotating steering mirror assembly 400 shown in FIG. 4 is similar to the rotating steering mirror assembly 100 of FIG. 1 above and the rotating steering mirror assembly 200 of FIG. 2 above, having a stacked configuration of a base 110, a first wedge 122, a second wedge 124, a mirror 126, a first motor 130, a second motor 136, and other supporting components, though provided according to different form and arrangement. And, according to one or more embodiments, the rotating steering mirror assembly 400 may be longer (e.g., axially) than the rotating steering mirror assembly 100 of FIG. 1 above and/or the rotating steering mirror assembly 200 of FIG. 2 above, though the rotating steering mirror assembly 400 may take up a smaller radial or width-wise footprint as compared to the rotating steering mirror assembly 100 of FIG. 1 above and/or the rotating steering mirror assembly 200 of FIG. 2 above.

For example, the base 110 can surround a portion of the first wedge 122 and a portion of the first motor 130, such as shown in FIG. 4. Also as shown, the second motor 136 can surround a portion of the second wedge 124. The second wedge 124 may not surround a portion of the first motor 130, and the second motor 136 can have a diameter less than a diameter of the first motor 130. Additionally, the second motor 136 may be axially offset from the first motor 130 such that the first motor 130 and the second motor 136 do not overlap in a side view of the rotating steering mirror assembly 400.

As shown in FIG. 4, the mating protrusion 127 of the first wedge 122 can extend into the channel 125 of second wedge 124. As shown in FIG. 5, the bearings 115 between the first wedge 122 and the second wedge 124 can be placed proximate the protrusion 127, rather than near the flanges of the base 110 as in the rotating steering mirror assembly 200 of FIG. 2 and FIG. 3. According to one or more embodiments, the width of the mounting surface $k_1$ can be less than the width of the mirror, $p_3$. In a non-limiting example, $k_1$=5.4 in. and $p_3$=6.0 in.

Thus, according to embodiments of the disclosed subject matter, the mirror 126 of the rotating steering mirror assembly 400 can be controlled to tilt according to desired angles, as shown in FIG. 5, based on the controlled independent rotation of the first wedge 122 and the second wedge 124 under control of the controller (not expressly shown in FIG.

4 and FIG. 5) providing control signals to the first and second motors 130, 136. According to one or more embodiments, the mirror 126 may be tilted to any angle between +/− the sum of respective angles of the first and second wedges 122, 124. In one non-limiting example, the angle of each of the wedges may be 12.5 degrees, which can mean that the mechanical tilt of the mirror 126 can be +/−25 degrees (e.g., 50 degrees of angular mechanical motion of the mirror surface, which provides up to 100 degrees of LOS steering).

Figures 6A, 6B, 6C:
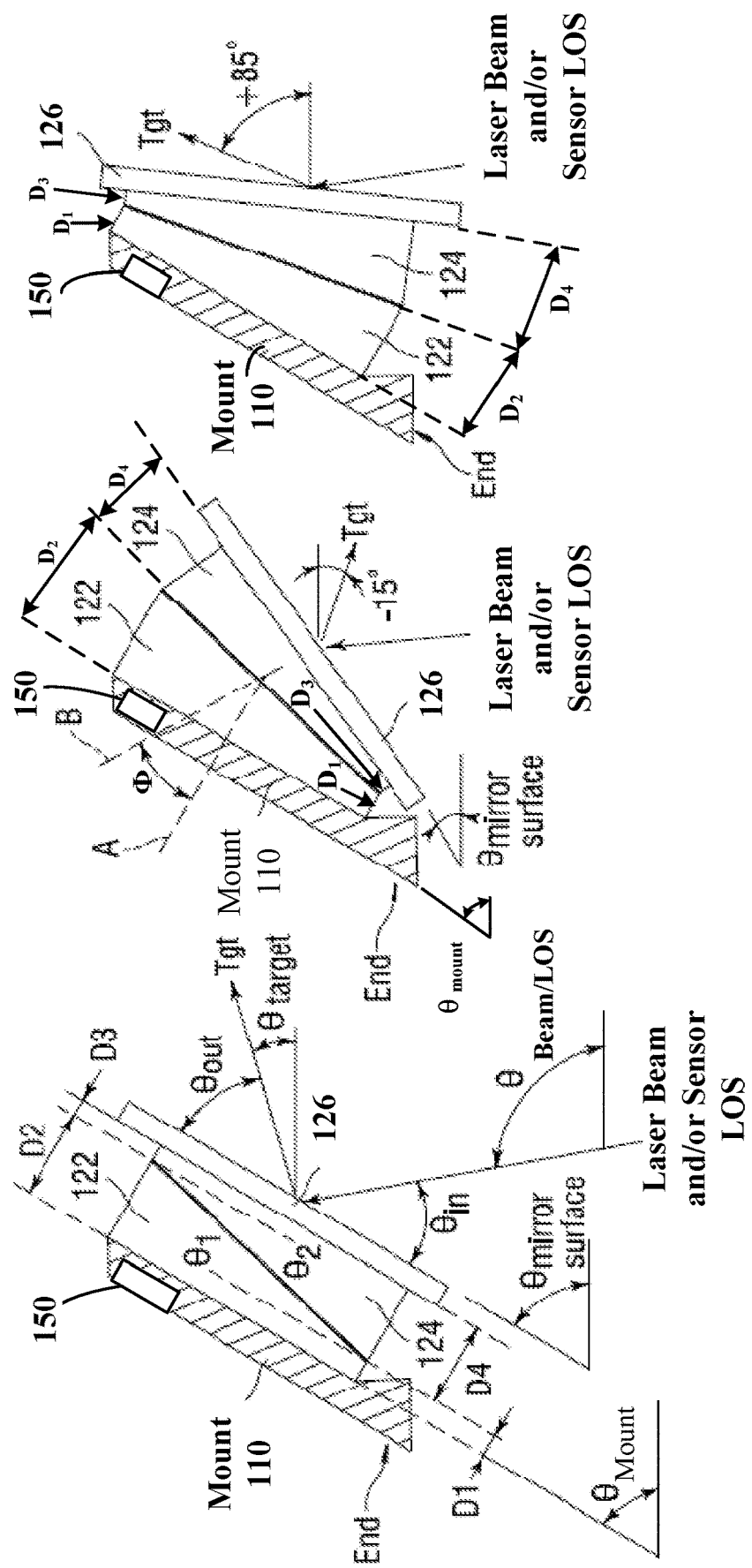
FIGS. 6A-6C show exemplary operational states of a rotating steering mirror according to embodiments of the disclosed subject matter.

Turning now to FIGS. 6A-6C, these figures show exemplary operational states of a rotating steering mirror according to embodiments of the disclosed subject matter. Such rotating steering mirror can be representative of rotating steering mirror assemblies according to embodiments of the disclosed subject matter, such as rotating steering mirror assembly 100, rotating steering mirror assembly 200, and rotating steering mirror assembly 400.

The first wedge 122, which may be rotatably coupled to mount or base 110, can have a generally triangular or wedge shape in its depth direction. The first wedge 122 can have a first wedge angle $\theta_1$, and the wedge shape can broaden from a thin end $D_1$ to a thick end $D_2$. In a non-limiting example, the angle $\theta_1$ of the first wedge 122 can be 12.5 degrees, which can mean that rotation of the first wedge 122 around an axis (e.g., axis A) can tilt the mirror 126 over a tilt angle of 25 degrees. The second wedge 124, which may be rotatably coupled relative to the first wedge 122 and the base 110, can have a second wedge angle $\theta_2$, and the wedge shape can broaden from thick to thin from a thin end $D_3$ to a thick end $D_4$. In a non-limiting example, the angle $\theta 2$ of the second wedge 124 can be the same as the first wedge 122, for instance, 12.5 degrees. Thus, rotation of the second wedge 124 can tilt the mirror 126 by a tilt angle of 25 degrees. Therefore, the mechanical tilt of the mirror 126 can be +/−25 degrees (e.g., 50 degrees of angular mechanical motion of the mirror surface, which provides up to 100 degrees of LOS steering). The depths of the first wedge 122 and the second wedge 124 may not necessarily be the same, but in one or more embodiments the ratios of the depths can be the same, that is, $$\frac{D_1}{D_2} = \frac{D_3}{D_4},$$

resulting in equal wedge angles ($\theta_1=\theta_2$) for embodiments with equal wedge diameters. The minimum wedge depths ($D_1$ and $D_3$) and diameters can be generally guided by requirements for embodiment compactness and/or mechanical stiffness. The wedge angles ($\theta_1$ and $\theta_2$) can be generally equal in embodiments, but they need not be equal. Further, the wedge diameters are not required to be equal to satisfy the above ratios. The magnitude of the wedge angles, depths and diameters can be generally guided by requirements for desired LOS steering angles, steering precision, and/or steering agility.

Thus, according to embodiments of the disclosed subject matter, the mirror 126 can be controlled, based on control of a controller 150, to tilt according to desired angles based on the controlled independent rotation of the first wedge 122 and the second wedge 124 by providing control signals to the first and second motors 130, 136.

According to one or more embodiments, the mirror 126 may be tilted to any angle between +/− the sum of respective angles of the first and second wedges 122, 124. In one non-limiting example, the angle of each of the wedges may be 12.5 degrees, which can mean that the mechanical tilt of the mirror 126 can be +/−25 degrees (e.g., 50 degrees of angular mechanical motion of the mirror surface, which provides up to 100 degrees of LOS steering).

According to embodiments of the disclosed subject matter, the steering angle can be determined based on the following equation:

$$\theta_{target}=2\times\theta_{mirror\ surface}-\theta_{beam/LOS},$$

where $\theta_{target}$ is the steering angle, i.e., the angle the reflected beam (e.g., laser beam and/or sensor LOS) makes with the horizontal, where $\theta_{mirror\ surface}$ is the angle the mirror surface makes with the horizontal, and where $\theta_{beam/LOS}$ is the angle the beam and/or sensor LOS makes with the horizontal.

FIG. 6A illustrates a center elevation steering angle state, where the first and second wedges 122, 124 can be aligned so the thin end $D_3$ of the second wedge 124 corresponds (e.g., lines up with) the thick end $D_2$ of the first wedge 122 and so the thin end $D_1$ of the first wedge 122 corresponds (e.g., lines up with) to the thick end $D_4$ of the second wedge 124. In the center elevation steering angle state an angle (i.e., mounting angle) $\theta_{mount}$ (shown in FIG. 6A) of the mount or base 110 can be the same as an angle $\theta_{mirror\ surface}$ of the mirror 126. In this example, the output from the mirror 126 can be based on the angle the mirror surface θ mirror surface and the input angle for the beam $\theta_{beam/LOS}$ per the equation set forth above. The combination of the target angle $\theta_{target}$ and an input angle $\theta_{beam/LOS}$ relative to the mounting angle $\theta_{mount}$ can equal the mounting angle $\theta_{mount}$. In a non-limiting example, an input beam angle $\theta_{beam/LOS}$ of 105 degrees and a mounting angle $\theta_{mount}$ of 70 degrees can result in a mirror surface angle $\theta_{mirror\ surface}$ angle of 80 degrees and a target angle $\theta_{target}$ of 35 degrees in the center elevation steering angle state shown in FIG. 6A. Although the figures show first and second wedges 122, 124 of equal wedge angle, the wedge angles and/or wedge diameters may be unequal through a range as needed to achieve specific steering angles.

FIG. 6B illustrates a minimum elevation steering angle state, where thin ends $D_1$ and $D_3$ of the first and second wedges 122, 124 correspond (e.g., lined up) and are closest to a vertex of the mounting angle $\theta_{mount}$ and thick ends $D_2$ and $D_4$ of the first and second wedges 122, 124 correspond (e.g., lined up) and are farthest from the vertex of the mounting angle $\theta_{mount}$. FIG. 6B also shows an offset of an axis B of the second wedge 124 from the axis A of the first wedge 122 by an angle Φ. In the minimum elevation steering angle state the target angle $\theta_{target}$ can be, based on the angle of the first and second wedges 122, 124, fifty degrees offset from the target angle $\theta_{target}$ in the center elevation steering angle state, in this example, minus fifteen degrees.

FIG. 6C illustrates a maximum elevation steering angle state, where thin ends $D_1$ and $D_3$ of the first and second wedges 122, 124 correspond (e.g., lined up) and are farthest from a vertex of the mounting angle $\theta_{mount}$ and thick ends $D_2$ and $D_4$ of the first and second wedges 122, 124 correspond (e.g., lined up) and are closest to the vertex of the mounting angle $\theta_{mount}$. In the maximum elevation steering angle state the target angle $\theta_{target}$ can be, based on the angle of the first and second wedges 122, 124, fifty degrees offset from the target angle $\theta_{target}$ in the center elevation steering angle state, in this example, plus eighty-five degrees. In a non-limiting example, an input beam angle $\theta_{beam/LOS}$ of 105 degrees and a mounting angle $\theta_{mount}$ of 70 degrees can result in a mirror surface angle $\theta_{mirror\ surrace}$ angle of 80 degrees and a target angle $\theta_{target}$ of 85 degrees in the center elevation steering angle state shown in FIG. 6C.

Embodiments of the disclosed subject matter may also be as set forth according to the parentheticals in the following paragraphs.

(1) A rotating agile steering mirror comprising: a nested cylindrical geometry including: a cylindrical base assembly having a first central bore having an axis A, a first stator, a first motor, a first encoder, a first set of bearings and a first radial outer surface; a first wedge assembly having a second central bore concentrically located along axis A, a first wedge top surface, a first rotor, a second stator, a second motor, a first read head, a second read head, a second set of bearings and a second radial outer surface, wherein the second central bore surrounds at least a portion of the first radial outer surface and is rotatably coupled to the base by the first set of bearings; a second wedge assembly having a third central bore having an axis B, where B makes an angle Φ with axis A, a second wedge bottom surface, a second wedge top surface, a third radial outer surface, a second rotor, a second encoder, wherein the third central bore surrounds at least a portion of the second radial outer surface and is rotatably coupled to the first wedge assembly by the second set of bearings; and a mirrored surface on the second wedge top surface.

(2) The rotating agile steering mirror according to (1), wherein the first wedge top surface has a thickness in the axial direction which varies evenly from a minimum thickness $D_1$ to a maximum thickness $D_2$; wherein the second wedge bottom surface has a thickness in the axial direction which varies evenly from a minimum thickness $D_3$ to a maximum thickness $D_4$; wherein the thicknesses are related by the equation $$\frac{D_1}{D_2} = \frac{D_3}{D_4}.$$

(3) The rotating agile steering mirror according to (1) or (2), wherein the thicknesses $D_1$, $D_2$, $D_3$ and $D_4$ are chosen such that rotation of the first wedge with respect to the second wedge tilts the mirror relative to the base assembly.

(4) The rotating agile steering mirror according to any one of (1) to (3), further comprising: wherein the first motor is positioned between a first radial inner surface of the first wedge assembly and the first radial outer surface of the base assembly; and wherein the second motor positioned is between the second radial outer surface and a second radial inner surface of the second wedge assembly.

(5) The rotating agile steering mirror according to any one of (1) to (4), wherein the first stator is positioned between the first radial inner surface of the first wedge assembly and the first motor; wherein the second stator is positioned between the second radial outer surface and the second motor; wherein the first rotor is positioned on the first radial inner surface of the first wedge assembly proximate the first motor; and wherein the second rotor is positioned on the second radial inner surface of the second wedge assembly proximate the second motor.

(6) The rotating agile steering mirror according to any one of (1) to (5), wherein the first encoder is positioned on a top surface of a wall of the cylindrical base assembly proximate the first wedge assembly; wherein the first read head is positioned on the first wedge assembly proximate the top surface of the wall of the cylindrical base assembly; wherein the second read head is positioned on the first wedge top surface; and wherein the second encoder is positioned on the second wedge bottom surface proximate the second read head.

(7) The rotating agile steering mirror according to any one of (1) to (6), further comprising: a controller connected to the motors, the read heads and the encoders, wherein the controller includes circuitry configured to control the rotational position of the first wedge assembly with respect to the base assembly and to control the rotational position of the second wedge assembly with respect to the first wedge assembly based on rotational position readings taken by the read heads and the encoders.

(8) The rotating agile steering mirror according to any one of (1) to (7), the cylindrical base assembly further comprising: a cylindrical flange integral with the cylindrical base assembly and axially located opposite the wedge assemblies, where the cylindrical flange has a greater diameter than a diameter of the cylindrical base assembly; wherein the cylindrical flange is configured to provide a mounting surface for the cylindrical base assembly; and wherein the cylindrical flange includes a pocket to hold the controller.

(9) The rotating agile steering mirror according to any one of (1) to (8), wherein the second wedge assembly is rotatable about a portion of the first wedge assembly, and wherein the first wedge assembly is rotatable about a portion of the cylindrical base assembly.

(10) The rotating agile steering mirror according to any one of (1) to (9), wherein the mirror surface is a high reflective coating on the second wedge top surface; wherein the high reflective coating is one of an aluminum coating, a silver coating, and a gold coating.

(11) The rotating agile steering mirror according to any one of (1) to (10), wherein the mirror surface is formed by polishing the second wedge top surface.

(12) The rotating agile steering mirror according to any one of (1) to (11), wherein the mirror surface is one of polished aluminum, polished silver, polished gold, nickel-plated beryllium and a polished glass substrate; wherein the mirror surface is attached to the second wedge top surface.

(13) The rotating agile steering mirror according to any one of (1) to (12), wherein the encoders, the bearings, the stators, the rotors and the motors are encoder rings, bearing rings, stator rings, rotor rings and motor rings; wherein the encoder rings, bearing rings, stator rings, rotor rings and motor rings are positioned within circular channels within respective base, first wedge and second wedge assemblies.

(14) A rotating agile steering mirror assembly comprising: a base; a first wedge assembly rotatably connected to the base; a second wedge assembly rotatably connected to the first wedge assembly; and a mirrored surface on a top surface of the second wedge assembly.

(15) The rotating agile steering mirror assembly according to (14), wherein the base, the first wedge assembly and the second wedge assembly each have substantially cylindrical configurations, such that: the first wedge assembly surrounds at least a portion of the base; and the second wedge assembly surrounds at least a portion of the first wedge assembly.

(16) The rotating agile steering mirror assembly according to (14) or (15), further comprising: a first motor, a first encoder and a first read head located between the base and the first wedge, the first motor configured to rotate the first wedge with respect to the base; a second motor, a second encoder and a second read head located between the first wedge and the second wedge, the second motor configured to rotate the second wedge with respect to the first wedge; and a controller connected to the motors, the encoders and the read heads, wherein the controller includes circuitry configured to control the rotational position of the first wedge assembly with respect to the base assembly and to control the rotational position of the second wedge assembly with respect to the first wedge assembly based on rotational position readings taken by the read heads and the encoders.

(17) The rotating agile steering mirror assembly according to any one of (14) to (16), wherein a top surface of the first wedge assembly broadens from a first thickness $D_1$ to a second thickness $D_2$; wherein a bottom surface of the second wedge assembly broadens from a first thickness $D_3$ to a fourth thickness $D_4$; and wherein the thicknesses are related by the equation $$\frac{D_1}{D_2} = \frac{D_3}{D_4}.$$

(18) The rotating agile steering mirror according to any one of (14) to (17), wherein the thicknesses $D_1$, $D_2$, $D_3$ and $D_4$ are chosen such that rotation of the first wedge with respect to the second wedge tilts the mirror relative to the base assembly.

(19) A method for operating a rotating agile steering mirror, comprising: reading, by a first read head of a first encoder, a position of a first wedge assembly with respect to a base assembly; reading, by a second read head of second encoder, a position of a second wedge assembly with respect to the first wedge assembly; rotating, by a first motor, the first wedge assembly with respect to the base assembly based on the reading of the position of the first wedge assembly; rotating, by a second motor, the second wedge assembly with respect to the first wedge assembly based on the reading of the position of second wedge assembly; controlling, by a controller connected to the motors, the encoders and the read heads, the rotational positions of the first wedge assembly and the second wedge assembly until a mirror surface on the second wedge assembly is tilted to a desired angle with respect to the base assembly.

(20) The method according to (19), wherein the desired angle is in the range of 100 degrees.

(21) A rotating agile steering mirror (RASM) assembly comprising: a base provided at a rear of the RASM assembly; a first wedge rotatable relative to the base; a second wedge rotatable relative to the first wedge; a first motor operatively coupled to the first wedge to rotatably move the first wedge relative to the base and the second wedge; a second motor operatively coupled to the second wedge to rotatably move the second wedge relative to the first wedge and the base; a first rotary encoder operative with the first motor to determine position of the first motor; a second rotary encoder operative with the second motor to determine position of the second motor; and a mirror provided at a front of the RASM assembly and rotatable in correspondence with the second wedge, wherein the first wedge and the second wedge are stacked relative to each other, wherein the first wedge and the second wedge are independently and exclusively drivable by the first motor and the second motor, respectively, and wherein the mirror is tiltable, based on controlled independent rotation of the first wedge and the second wedge, to any angle between +/− the sum of respective angles of the first and second wedges.

(22) The RASM assembly according to (21), further comprising one or more first bearings between a radially-outward-facing surface of the base at an outer periphery thereof and a radially-inward-facing surface of the first wedge.

(23) The RASM assembly according to (21) or (22), further comprising one or more second bearings between a radially-outward-facing surface of the first wedge at an outer periphery thereof and a radially-inward-facing surface of the second wedge.

(24) The RASM assembly according to any one of (21) to (23), further comprising one or more second bearings at an outer periphery of the first wedge, between the outer periphery of the first wedge and the second wedge.

(25) The RASM assembly according to any one of (21) to (24), wherein the first motor radially surrounds a portion of the base.

(26) The RASM assembly according to any one of (21) to (25), wherein the first wedge is closer to the base than the second wedge to the base.

(27) The RASM assembly according to any one of (21) to (26), wherein the first wedge radially surrounds the base.

(28) The RASM assembly according to any one of (21) to (27), wherein an outer radial surface of the second wedge is cylindrical, wherein the outer radial surface forms a radially outer-most portion of the RASM assembly, wherein the outer radial surface radially surrounds a portion of the first wedge, and wherein the first wedge radially surrounds the base.

(29) The RASM assembly according to any one of (21) to (28), wherein the base radially surrounds a portion of the first wedge.

(30) The RASM assembly according to any one of (21) to (29), wherein the second motor radially surrounds a portion of the first wedge.

(31) The RASM assembly according to any one of (21) to (30), wherein the angles of the first and second wedge are the same.

(32) The RASM assembly according to any one of (21) to (31), wherein the mirror is formed by the second wedge.

(33) The RASM assembly according to any one of (21) to (33), wherein the mirror is coupled to the second wedge.

(34) A rotating steering mirror assembly comprising: a base; a first wedge rotatably connected to the base; a second wedge rotatably connected to the first wedge; and a mirrored surface on a front surface of the second wedge.

(35) The rotating steering mirror assembly of (34), wherein the base, the first wedge, and the second wedge each has substantially cylindrical configurations, such that: the first wedge surrounds at least a portion of the base, and the second wedge surrounds at least a portion of the first wedge.

(36) The rotating steering mirror assembly of (34) or (35), further comprising: a first motor, a first encoder and a first read head associated with the first wedge, the first motor being configured to rotate the first wedge with respect to the base, a second motor, a second encoder and a second read head associated with the second wedge, the second motor being configured to rotate the second wedge with respect to the first wedge, and a controller connected to the motors, the encoders and the read heads, wherein the controller includes circuitry configured to control rotational position of the first wedge with respect to the base assembly and to control rotational position of the second wedge with respect to the first wedge based on rotational position readings taken by the read heads and the encoders.

(37) The rotating steering mirror assembly of any one of (34) to (36), wherein a top surface of the first wedge assembly broadens from a first thickness $D_1$ to a second thickness $D_2$, wherein a bottom surface of the second wedge assembly broadens from a first thickness $D_3$ to a fourth thickness $D_4$, and wherein the thicknesses are related by the equation $$\frac{D_1}{D_2} = \frac{D_3}{D_4}.$$

(38) The rotating steering mirror assembly of any one of (34) to (37), wherein the angles of the first and second wedge are the same, and wherein the mirror is formed by the second wedge.

(39) A method regarding a rotating steering mirror, comprising: providing a base of the rotating steering mirror assembly; providing a first wedge of the rotating steering mirror assembly, the first wedge being rotatable relative to the base; providing a second wedge of the rotating steering mirror assembly, the second wedge being rotatable relative to the first wedge; providing a first motor of the rotating steering mirror assembly, the first motor being operative to rotate the first wedge relative to the base and the second wedge; providing a second motor of the rotating steering mirror assembly, the second motor being operative to rotate the second wedge relative to the first wedge and the base; and providing a mirror, the mirror being rotatable in correspondence with the second wedge, wherein the first wedge and the second wedge are stacked relative to each other, and wherein the first wedge and the second wedge are independently and exclusively drivable by the first motor and the second motor, respectively.

(40) The method of (39), further comprising independently rotating the first wedge and/or the second wedge to modify an angle of the mirror using the first motor and/or the second motor, respectively, said independently rotating being based on feedback position signals from a first sensing assembly and/or a second sensing assembly, respectively, each having a read head and an encoder.

Having now described embodiments of the disclosed subject matter, it should be apparent to those skilled in the art that the foregoing is merely illustrative and not limiting, having been presented by way of example only. Thus, although particular configurations have been discussed and illustrated herein, other configurations can be and are also employed. Further, numerous modifications and other embodiments (e.g., combinations, rearrangements, etc.) are enabled by the present disclosure and are contemplated as falling within the scope of the disclosed subject matter and any equivalents thereto. Features of the disclosed embodiments can be combined, rearranged, omitted, etc., within the scope of described subject matter to produce additional embodiments. Furthermore, certain features may sometimes be used to advantage without a corresponding use of other features. Accordingly, Applicant intends to embrace all such alternatives, modifications, equivalents, and variations that are within the spirit and scope of the present disclosure. Further, it is therefore to be understood that within the scope of the appended claims, the disclosure may be practiced otherwise than as specifically described herein.

The invention claimed is:

1. A rotating agile steering mirror (RASM) assembly comprising:
a base provided at a rear of the RASM assembly;
a first wedge rotatable relative to the base;
a second wedge rotatable relative to the first wedge;
a first motor operatively coupled to the first wedge to rotatably move the first wedge relative to the base and the second wedge;
a second motor operatively coupled to the second wedge to rotatably move the second wedge relative to the first wedge and the base;
a first encoder operative with the first motor to determine position of the first motor;
a second encoder operative with the second motor to determine position of the second motor; and
a mirror provided at a front of the RASM assembly, the mirror coupled to the second wedge and rotatable with the second wedge,
wherein the first wedge and the second wedge are radially stacked relative to each other such that a portion of the first wedge and a portion of the second wedge radially overlap,
wherein the first wedge and the second wedge are independently and exclusively drivable by the first motor and the second motor, respectively, and
wherein the mirror is tiltable, based on controlled independent rotation of the first wedge and the second wedge, to any one of an angle between +/− the sum of respective angles of the first and second wedges.

2. The RASM assembly according to claim 1, further comprising one or more first bearings between a radially-outward-facing surface of the base at an outer periphery thereof and a radially-inward-facing surface of the first wedge.

3. The RASM assembly according to claim 2, further comprising one or more second bearings between a radially-outward-facing surface of the first wedge at an outer periphery thereof and a radially-inward-facing surface of the second wedge.

4. The RASM assembly according to claim 1, further comprising one or more second bearings at an outer periphery of the first wedge, between the outer periphery of the first wedge and the second wedge.

5. The RASM assembly according to claim 1, wherein the first motor radially surrounds a portion of the base.

6. The RASM assembly according to claim 1, wherein the first wedge is closer to the base than is the second wedge.

7. The RASM assembly according to claim 1, wherein the first wedge radially surrounds the base.

8. The RASM assembly according to claim 1,
wherein an outer radial surface of the second wedge is cylindrical,
wherein the outer radial surface forms a radially outermost portion of the RASM assembly,
wherein the outer radial surface radially surrounds a portion of the first wedge, and
wherein the first wedge radially surrounds the base.

9. The RASM assembly according to claim 1, wherein the base radially surrounds a portion of the first wedge.

10. The RASM assembly according to claim 1, wherein the second motor radially surrounds a portion of the first wedge.

11. The RASM assembly according to claim 1, wherein the angles of the first and second wedge are the same.

12. The RASM assembly according to claim 1, wherein the mirror is formed by the second wedge.

13. The RASM assembly according to claim 1, wherein the mirror is coupled to a front surface of the second wedge.

14. A rotating steering mirror assembly comprising:
a base;
a first wedge rotatably connected to the base;
a second wedge rotatably connected to the first wedge, wherein a portion of the first wedge and a portion of the second wedge radially overlap; and
a mirrored surface on a front surface of the second wedge wherein the mirrored surface rotates with the second wedge.

15. The rotating steering mirror assembly of claim 14, wherein the base, the first wedge, and the second wedge each have substantially cylindrical configurations, such that:
the first wedge surrounds at least a portion of the base, and the second wedge surrounds at least a portion of the first wedge.

16. The rotating steering mirror assembly of claim 14, further comprising:
a first motor, a first encoder and a first read head associated with the first wedge, the first motor being configured to rotate the first wedge with respect to the base;
a second motor, a second encoder and a second read head associated with the second wedge, the second motor being configured to rotate the second wedge with respect to the first wedge; and
a controller connected to the motors, the encoders and to read heads, wherein the controller includes circuitry configured to control rotational position of the first wedge with respect to the base assembly and to control rotational position of the second wedge with respect to the first wedge based on rotational position readings taken by the read heads and the encoders.

17. The rotating steering mirror assembly of claim 14, wherein a top surface of the first wedge assembly broadens from a first thickness D1 to a second thickness D2, wherein a bottom surface of the second wedge assembly broadens from a first thickness D3 to a fourth thickness D4, and
wherein the thicknesses are related by the equation $$\frac{D_1}{D_2} = \frac{D_3}{D_4}.$$

18. The rotating steering mirror assembly of claim 14, wherein the angles of the first and second wedge are the same, and
wherein the mirror is formed by the second wedge.

19. A method regarding a rotating steering mirror assembly, comprising:
providing a base of the rotating steering mirror assembly;
providing a first wedge of the rotating steering mirror assembly, the first wedge being rotatable relative to the base;
providing a second wedge of the rotating steering mirror assembly, the second wedge being rotatable relative to the first wedge;
providing a first motor of the rotating steering mirror assembly, the first motor being operative to rotate the first wedge relative to the base and the second wedge;
providing a second motor of the rotating steering mirror assembly, the second motor being operative to rotate the second wedge relative to the first wedge and the base; and
providing a mirror, the mirror being rotatable with the second wedge,
wherein the first wedge and the second wedge are radially stacked relative to each other such that a portion of the first wedge and a portion of the second wedge radially overlap, and
wherein the first wedge and the second wedge are independently and exclusively drivable by the first motor and the second motor, respectively.

20. The method of claim 19, further comprising:
providing a first sensing assembly having a read head and an encoder, the first sensing assembly associated with the first wedge;
providing a second sensing assembly having a read head and an encoder, the second sensing assembly associated with the second wedge;
independently rotating the first wedge and/or the second wedge to modify an angle of the mirror using the respective motor, said independent rotation being based on feedback position signals from the respective sensing assembly.

* * * * *